United States Patent [19]

Bromley et al.

[11] Patent Number: 4,908,612
[45] Date of Patent: Mar. 13, 1990

[54] COMPUTER INPUT-OUTPUT DEVICE

[75] Inventors: Eric Bromley, West Simsbury; Robert Harris, Collinsville, both of Conn.

[73] Assignee: Penguin Products, Inc., Bloomfield, Conn.

[21] Appl. No.: 103,431

[22] Filed: Sep. 29, 1987

[51] Int. Cl.[4] .............................................. G09G 3/02
[52] U.S. Cl. ................................... 340/706; 340/711; 340/712
[58] Field of Search ........... 340/706, 711, 712, 365 R, 340/365 VL; 364/200, 300, 900; 434/118, 335; 341/22, 23

[56] References Cited

U.S. PATENT DOCUMENTS

| 4,145,745 | 3/1979 | De Bijl et al. | 364/200 |
|---|---|---|---|
| 4,204,253 | 5/1980 | van den Hanenberg et al. | 364/200 |
| 4,491,933 | 1/1985 | Ursin et al. | 364/900 |
| 4,509,122 | 4/1985 | Agnew et al. | 364/200 |
| 4,587,630 | 5/1986 | Straton et al. | 364/900 |
| 4,665,501 | 5/1987 | Saldin et al. | 364/900 |
| 4,823,311 | 4/1989 | Hunter et al. | 340/712 |

Primary Examiner—Gerald Brigance
Assistant Examiner—Richard Hjerpe
Attorney, Agent, or Firm—Fishman, Dionne & Cantor

[57] ABSTRACT

A computer input-output device for permitting a user to control the operation of an application program on a host computer. The device includes a display divisible into a plurality of sections for displaying the names of the options then available to the user at any point in the operation of the application program. Selection keys associated with each section allow the user to select the option displayed in the corresponding section. In response to the selection, the input device sends a series of keystroke codes to the keyboard input port of the host computer to cause the application program to execute the selected option. The host computer keyboard is connected to the input-output device which intercepts keystroke codes generated by the keyboard and transmits them to the computer only if the codes are designated as permissable ones. A set of programmable arrow keys controls the pointer functions of the application program on the host computer screen.

16 Claims, 6 Drawing Sheets

| 1 | PRC 18 |
| 2 | LBL READ DATA |
| 3 | KEY [R,<RET>] |
| 4 | SND [BEEP] |
| 5 | ALT 6, 28 |
| 6 | KEY [<TAB>] |
| 7 | RPT 3 |
| 8 | MSG NOW PRESS |
| 9 | ALT 4, 4 |
| 10 | KEY [x,5,3] |
| 11 | FLT 5 |
| 12 | JSG 12 |

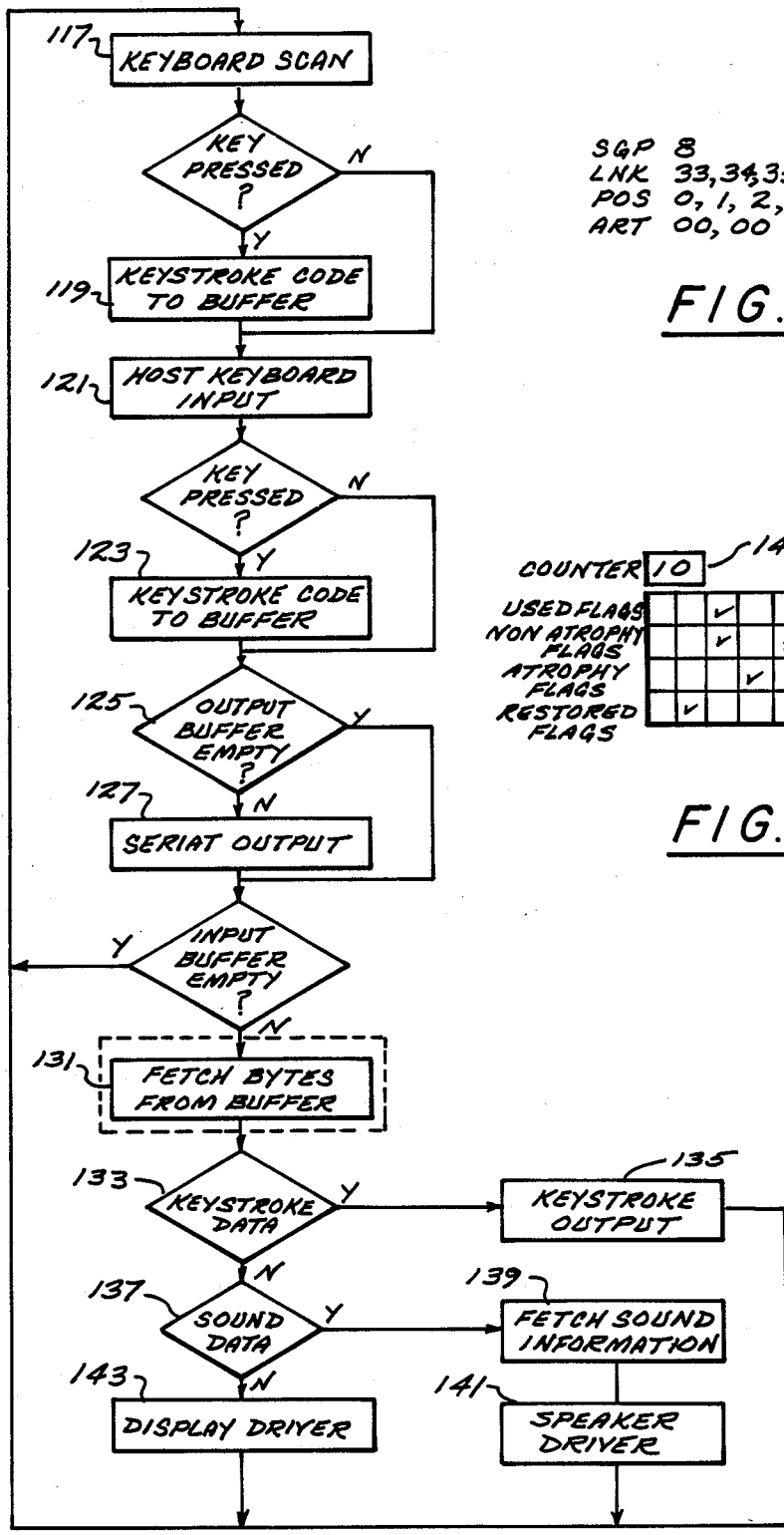
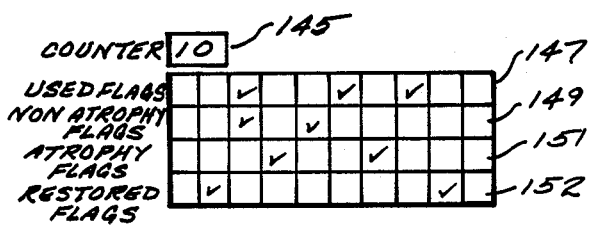
FIG. 9
FIG. 10
FIG. 5

COMPUTER INPUT-OUTPUT DEVICE

FIELD OF THE INVENTION

This invention relates generally to computer input-output (I/0) devices and more particularly to intelligent interactive computer I/0 devices for providing a simplified standard interface between application programs running on the computer and a user.

BACKGROUND OF THE INVENTION

The proliferation of personal computers over the last decade has caused a virtual revolution in the way computers are used in our society. Prior to the advent of the personal computer, data processing systems and the application programs run on them were generally large and complex and run by professionals. Persons other than computer professionals would normally have only limited access to the computer and application programs through remote terminals for purposes such as data input and making inquiries. In this environment the "user friendliness? of an application program was of only secondary importance since the professional users had the aptitude, motivation and time to become intimately familiar with the workings of each program they were dealing with.

All this has changed as a result of the personal computer. Now vast numbers of people with little or no training or aptitude in data processing have personal computers immediately available to them in their work places and oftentimes at home as well. This personal computer revolution has created an entire industry devoted to providing applications software with the result that large numbers of powerful application programs have become available for uses such as word processing, report generating, data bases, spread sheets and integrated programs combining several of these functions.

The availability of such powerful application programs for personal computers has the potential for making heretofore undreamed of computer power available to individuals in all walks of life. However, some basic problems have caused this potential to be realized only to a very limited extent. The primary interface with the user for most personal computer application programs is the computer keyboard. This keyboard is generally similar to the standard typewriter keyboard, often with the addition of a number of special function keys. To cause an application program to perform a particular function or operation, the user enters appropriate commands by striking one or more keys on the keyboard. It is generally desireable to require as few key strokes as possible for each instruction, so that an experienced user can operate the program rapidly. This however, results in the combination of keys for many instructions being rather arbitrary, particularly for the more complex applications programs. In some programs the particular set of key strokes for a given command can actually change depending on what portion of the application program is being used in a given time.

A further problem results from the fact that there are no standards among the large number of software vendors for application program command structures or for what set of key strokes should correspond to a given command. Therefore, it is necessary for the user to learn a whole set of commands anew for each application program which he needs to use. Although software vendors make strong claims for the "user friendliness" of their personal computer software products, even an experienced personal computer user requires a good deal of effort to learn how to take advantage of most of the capabilities of the more powerful application programs. This complexity intimidates many personal computer users, especially those who need to use a particular application program only occasionally and who are, in effect, faced with relearning how to use the program each time. These user interface problems have resulted in typical personal computer users being able to use only a small portion of the capabilities of the application programs available to them and in many personal computers sitting unused on desks.

Personal computer and software vendors have tried to make their systems easier and more efficient, at least for experienced users, by providing the capability of having a number of user defined macro-instructions (macros) which each correspond to a frequently used subroutine that can be called up by a single key stroke. Such macro-instruction capability is sometimes built into the personal computer, in which case a portion of the RAM memory is set aside for storing the subroutines corresponding to the macros. Some application programs also have a built-in macro-instruction capability in which case the storage of the macros in RAM memory and its integration with the overall software systems is handled by the application program. Separate macro instruction application programs are also available which are loaded into the computer and used in conjunction with the main application program.

A number of problems exist with each of these techniques which limit their utility, particularly for the occasional user. A set of macro-instructions is usable only with a given application program so that a different set must be generated and remembered by the user for each one. If extensive use is made of macros for a given application program, users must remember and select from a large number of alternatives each time they desire to enter a macro. In addition since the subroutines corresponding to the macros are stored in the main RAM memory they reduce the amount of memory available for the application program. When a separate macro-instruction program is used care must be exercised so that the macro-instruction program and the main application program do not try to use the same portions of memory. In addition, if a particular key is assigned to call up a macro, it can no longer be used for its normal function, thereby resulting in a loss of functionality.

The use of macros does little to address the above-discussed problems of the occasional user, and in many instances may exacerbate them. Not only must the user remember the standard set of commands for the particular application program, he must deal with the macros as well.

Other personal computers, such as the "Adam" computer manufactured by Coleco, have a plurality of "soft keys" on the keyboard each associated with a particular area of the CRT display screen. The application program on the computer is structure so that sets of options are provided to the user at appropriate times during the execution of the application program by displaying the names of the options in the areas of the display corresponding to the soft keys. The user selects an option by depressing the appropriate soft key which in turn causes the application program to execute the routine which implements the desired function. The options presented to the user and therefore the function commanded by striking of a soft key changes depending on what is being done by the application program In a similar manner application programs using a mouse present options to the user either by menus or icons displayed on the screen. The user selects a function by operating the mouse to position an on-screen pointer adjacent to a selected function and depressing a select button. The menu and icons presented can change to correspond to the options available at that point in the application program operation.

The soft key and mouse techniques are effective in making application programs that incorporate them easier to learn. There are, however, a number of problems associated with each of them. Since the subroutines corresponding to the icons and soft keys are incorporated in the application program, making any change in them requires consideration of the effect of the change on the operation of the entire program. It is therefore generally impossible to permit the user, no matter how knowledgeable, to make any modifications. In addition entering commands with a mouse is much slower than a keyboard for an experienced user. These techniques are also expensive in terms of computer memory and processing speed. Application programs incorporating them are generally more complex, more demanding of memory and more expensive than they would otherwise be.

A further problem is that soft key and mouse techniques normally are not able to handle some important user controlled functions of the application program such as cursor control which must be done from the keyboard with the problems discussed above of non-intuitive commands and commands that vary from program to program and within a given program.

The keyboard is a very rigorously defined interface in a personal computer. The keystroke signals generated by the depression of the keys are defined by the computer manufacturer and all application programs must conform to them. All application program functions are accessible from the keyboard. In addition, application programs are generally configured in such a way that they can not be modified or have their integrity affected by commands or codes entered from the keyboard.

SUMMARY OF THE INVENTION

In accordance with the invention applicants provide an interactive intelligent I/0 device for a host computer for allowing a user to control the execution of an application program (referred to as a Target Program) by the host computer. The I/0 device incorporates a processor unit controlled by a control program corresponding to the Target Program and a display for presenting the user, under control of the processor unit and control program, all of the options available to the user at that point in the execution of the Target Program. Means, such as keys associated with various parts of the display, are provided to allow the user to select the corresponding displayed option. In response to the user's selection of an option the control program causes the processor unit to transmit a series of key stroke codes to the host computer to cause the Target Program to implement the selected option. Depending on which option is selected, the control program next causes the processor unit to display a next set of options available to the user.

In accordance with one aspect of the invention the control programs may be stored in cartridges which are insertable into a cartridge port in the I/0 device. Each control program corresponds to a particular Target Program and is normally stored in the cartridge in ROM. Inserting a cartridge containing the corresponding control program into the cartridge port of the I/0 device is all that is required to ready the I/0 device to control the operation of a given Target Program. The cartridge may also contain a selectively alterable memory such as a RAM for storing information to adapt the control program to the needs of a particular user. Thus, in accordance with another aspect of the invention, information can be stored to implement an atrophy function to selectively eliminate options which are not needed by the user and to allow the user to modify the control program stored in ROM by storing the changed portions in the alterable memory.

The I/0 device may provide programmable cursor control which gives the user a standard and powerful way of controlling the movement of a cursor or window on the computer display associated with the Target Program. The cursor control system may include a first set of arrow keys for moving the cursor by a single unit in the indicated direction and a second set of arrow keys for moving the cursor by a selected increment in the indicated direction. Also provided are means for choosing the size of the selected increment which the cursor is moved.

An important aspect of the invention is that the communication from the I/0 device to the host computer is through the generation by the I/0 device of signals which emulate key strokes and other signals generated by the keyboard and that the system makes use of the rigorously defined keyboard interface of the computer. Thus changes can be made in the control program without having to be concerned about any impact on the integrity of the Target Program. The I/0 device is connected to the keyboard I/0 port of the host computer and further includes a port for connecting the host computer keyboard to the I/0 device. Keystrokes entered on the host keyboard are intercepted by the I/0 device and depending on the control program, may be transmitted to the host computer, blocked or used to further control the operation of the I/0 device.

To deal with the problem of application programs in which the keystrokes required to implement a particular task change from one part of the application program to another, the I/0 device according to the invention is capable of making compensating changes in the keystroke sequences it sends to the host computer in response to the selection of a particular option by the user.

In accordance with a further aspect of the invention the I/0 device of the invention may include a data interface port connected to the serial or parallel port of the host computer for allowing the I/0 device to receive information from and, optionally, transmit information to the host computer.

According to another aspect of the invention, the I/0 device includes selectively actuable means for causing the actuation of selected keys on the host computer keyboard to call up corresponding options from the ROM or the RAM and thereby to cause the processor unit to send a corresponding series of keystrokes to the host computer or to take other appropriate action.

These and other advantages and features of the invention can be more fully understood from the following detailed description of the preferred embodiment of the invention illustrated in the accompanying drawings.

BRIEF DESCRIPTION OF DRAWINGS

FIG. 5 is a flow chart of the dispatch routine of an I/0 device in accordance with the invention.

FIG. 9 illustrates a KLISP selection group routine in accordance with the invention.

FIG. 10 shows an atrophy counter table according to the illustrated embodiment of the invention.

DESCRIPTION OF THE PREFERRED EMBODIMENT

Figures 1, 8:
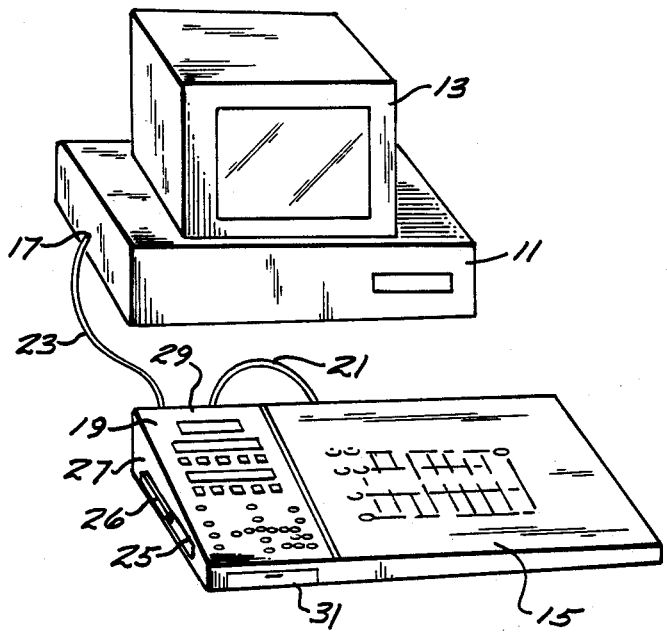
FIG. 1 is an illustration of an I/0 device of the invention connected to a host personal computer and host computer keyboard.
FIG. 8 illustrates a KLISP software procedure in accordance with the invention.

Referring to FIG. 1 of the drawings there is shown a host personal computer 11 such as, for instance, an IBM PC or PC AT or one of their clones. CRT display 13 is connected to the personal computer 11 for displaying textual and graphic information under the control of an application program being run on the personal computer 11. The keyboard 15 is a standard personal computer keyboard with the normal typewriter keys in addition to special control and function keys. The keyboard 15 is normally wedge-shaped for ergonomic reasons.

The keyboard 15 is normally attached to computer 11 by means of an electrical cable extending from the keyboard 15 to a keyboard input port 17 on the personal computer 11. In accordance with the illustrated embodiment of the invention however, the keyboard 15 is attached to the interactive intelligent I/0 device 19 of the invention by means of an electrical cable 21. The I/0 device 19 may conveniently be configured to match the ergonomic wedge shape of the keyboard 15. The I/0 deVice 19 may also be manufactured in the same cabinet with a keyboard. This combined unit could entirely replace the original keyboard 15.

The I/0 device 19 is connected to the keyboard I/0 port 17 of the host personal computer 11 by means of an electrical cable 23. The I/0 device 19 has a cartridge port 25 in the side 27 opposite to that connected to the keyboard 15 for receiving cartridges 26 containing control programs which adapt the I/0 device 19 to allow the user to control the operation of a target application program running on the host personal computer 11. The Target Program might be any one of the myriad well known applications program commercially available for use with personal computers. Current examples include programs such as Lotus 1-2-3, Word Perfect, etc.

A cartridge 26 is shown installed in the port 25. The port 25 is preferably capable of receiving two cartridges at once for purposes which will be explained hereinafter.

The top face 29 of the I/0 device 19 contains a number of LCD displays and control keys for allowing the user to control the operation of the Target Program on computer 11. Edit drawer 31 contains a number of editing keys for allowing the user to modify the control program stored in the cartridge 26 inserted in cartridge port 25 and to perform certain other functions which will be described in more detail below.

Figure 2:
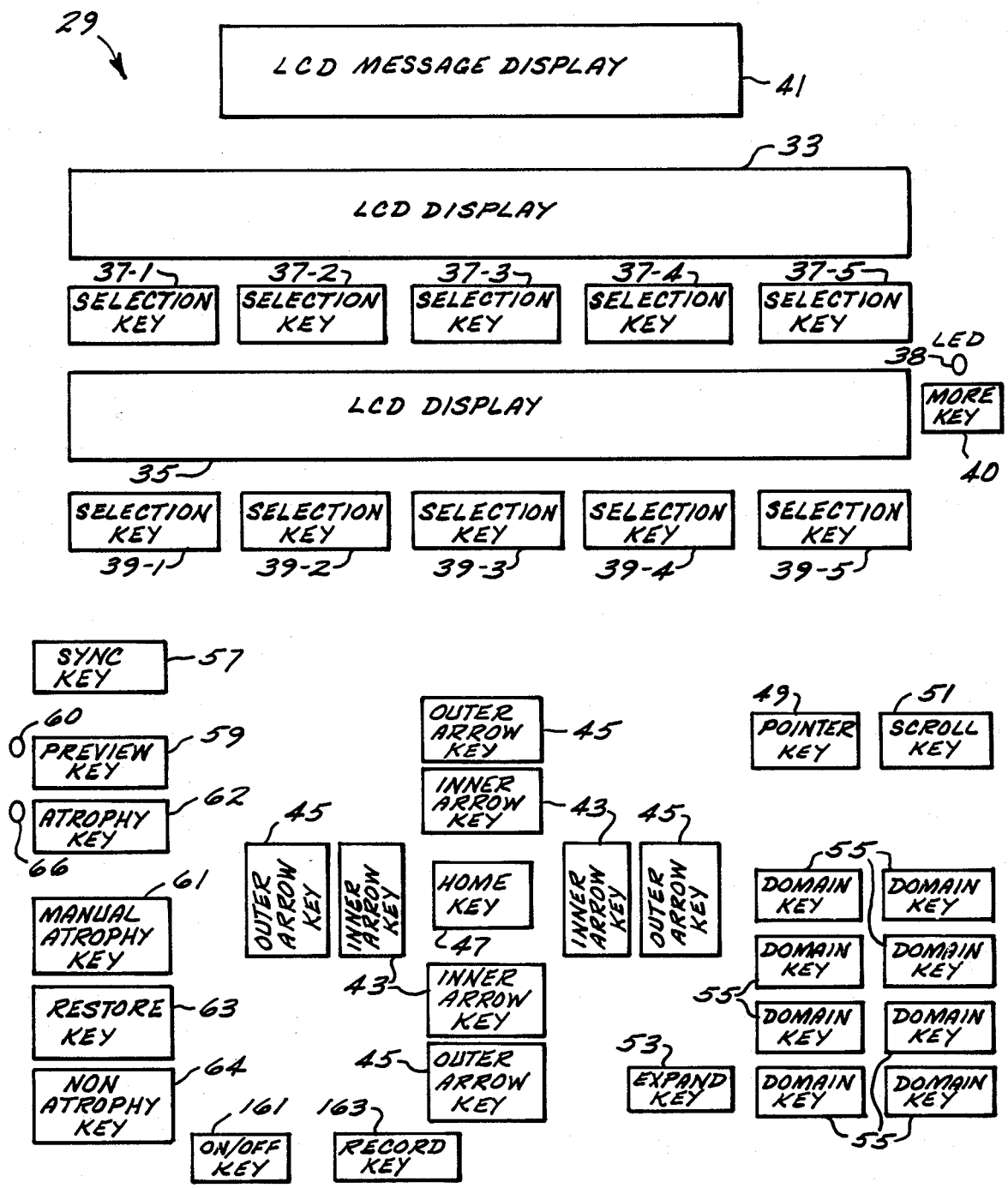
FIG. 2 is a view of the top panel of an I/0 device in accordance with the invention.

The top face 29 of the I/0 device 19 is shown in more detail in FIG. 2. A pair of LCD displays 33 and 35 are each able to display two lines of 44 characters each. Each of the liquid crystal displays 33 and 35 may be divided under software control into 5 sections for displaying the names or labels of up to 10 options available to the user at a given point in the execution of the Target Program on the personal computer 11. Each of such sections of the displays 33 and 35 can display 2 lines of up to 8 characters each. If desired, 2 adjacent sections can be combined to form a double-wide section of 2 lines of 17 characters. Visual separation between adjacent sections of the displays 33 and 35 can be achieved either by reverse video techniques or by displaying a thin vertical line between adjacent sections.

A set of 5 selection keys 37-1 through 37-5 is disposed adjacent to the different sections of the display 33 for allowing the user to select the option whose name is displayed in the corresponding section of the display 33. A similar set of selection keys 39-1 through 39-5 are disposed adjacent to the segments of the display 35. The names of the options displayed in the section of the display 33 and 35 in effect constitute variable labels for the associated selection keys 37 and 39.

If there are more options available at one time than fit in the display 33 and 35 the "more" indicator light 38 is actuated. To see the additional options the "more" key 40 is pressed which changes the displays 33 and 35 to show the remaining options. Pressing the "more" key 40 again restores the first set of options to the displays 33 and 35.

A message display 41 is positioned above the key label display 35. The message display 41 may also be formed from an LCD and may be capable of displaying a message of up to 52 characters in the form of 2 lines of 26 characters each. Longer messages and instructions can be displayed in the message display 41 by scrolling the display 41 in the manner to be explained below. If desired, the message display LCD 41 may have a different background color than that of the key label displays 33 and 35.

The I/0 device 19 allows the user to control the pointer functions, (cursor, highlighting, window and scrolling) of a Target Program on the host computer 11 by means of inner arrow keys 43, outer arrow keys 45, home key 47, pointer key 49, scroll key 51, expand key 53 and an array of 8 domain keys 55 arranged in 2 columns of 4 keys each. By proper programing assignments in the control program, the cursor and window control may be made uniform for all target application programs on the personal computer 11. The four inner arrow keys 43 move the cursor or window up or down, left or right by a single increment for each depression. The four outer arrow keys 45 move the cursor or window by an amount selected by means of the domain keys 55. The home key 47 moves the cursor to a home position such as the upper left hand corner of the screen. The domain keys 55 are used to change the size of the cursor domain and may be organized, for instance, into two groups such as; a syntactical group of word, sentence, paragraph, document and a physical group of line, block, page and chapter. The expand key is used to expand the cursor domain to a irregular size if permitted by the Target Program. It operates by anchoring one side of the cursor or window so that subsequent actuation of an arrow key lengthens the portion of the display encompassed by the cursor or window. The scroll key 51 allows the user to move the text or graphic material displayed on the screen of the computer display 13 while keeping the cursor or window fixed. The pointer key 49 cancels the effect of the scroll key 51.

The sync key 57 is used to synchronize the control program in the cartridge 26 with the Target Program running on the host computer 11. It operates to cause the control program and the Target Program both to return to a given known state.

There are seven available modes of operation of the illustrated embodiment of the I/0 device 19. When the I/0 device 19 is first turned on by turning on the host computer 15, it is in the command, or run, mode in which the control program in the cartridge 26 is executed. The preview mode is selected by actuation of the key 59, which allows the user to preview the names of the various options that may be presented by the control program. The LED 60 lights when the preview mode is selected. A manual atrophy mode may be selected by depressing key 61 in order to manually atrophy options which the user does not need to have presented. A non-atrophy mode is selected by depressing the non-atrophy key 64 which allows the user to designate selected options as non-atrophiable. The restore mode is selected by depressing key 63 and is used to restore atrophied options. The atrophy function can be turned off by depressing key 62. LED 66 lights to indicate that the atrophy function is off. I/0 device 19 can also operate in an edit mode which is selected by depressing an edit key in the edit drawer 31 or on an edit key pad attached to the I/0 device.

Alternatively, the user can add new options to those displayed by use of the "custom key" mode controlled by the keys 161 and 163. The ON/OFF key 161 is used to enter or exit the "custom key" mode, while the record key 163 is used at various times during the entry of the new program to indicate the beginning or the end of a part of the program.

Figure 3:
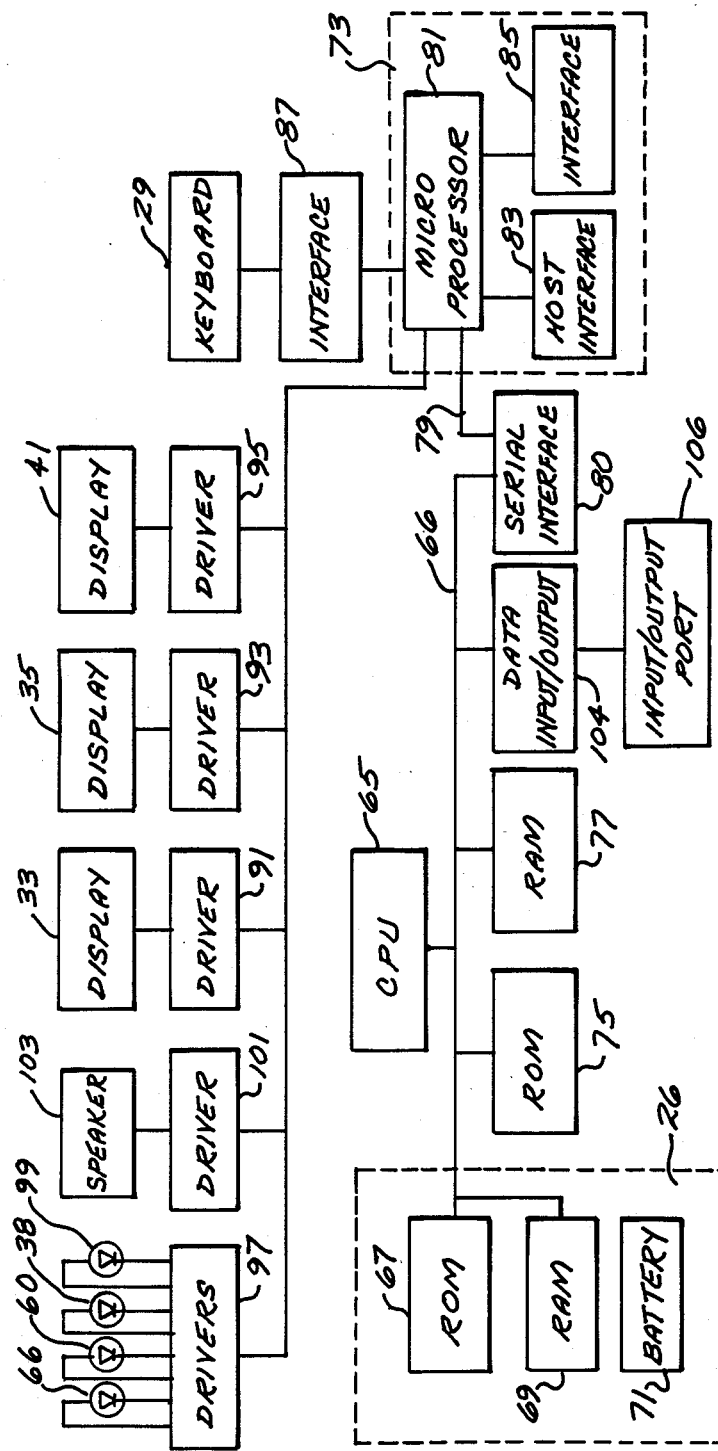
FIG. 3 is a schematic block diagram of the electronic circuitry of an I/0 device of the invention.

FIG. 3 in the drawings illustrates a schematic block diagram of the electronic circuitry of the I/0 device 19 in accordance with the illustrated embodiment of the invention. The central processing unit 65 may consist of a 8 bit microprocessor such as the model Z80 microprocessor manufactured by Zilog and others. The microprocessor 65 is connected by a multiconductor parallel bus 66 to the cartridge 26 installed in the cartridge port 27 (FIG. 1). Cartridge 26 stores the control program that specializes the input device 19 to control the operation of the Target Program on the host computer 11. The control program is stored in ROM memory 67 contained in the cartridge 26. Cartridge 26 also contains a RAM memory 69 which may be used for storing information such as the modifications made to the control program by the user when operating in the edit or "custom key" mode, the atrophy status of various options and other information which will be discussed more fully below. RAM 69 may also be used to store look-up tables used by the CPU 65 during execution of the control program for addressing and other functions which will be described below.

The battery back-up 71 is provided to permit the retention of the information stored in the RAM 69 during periods when the cartridge is not plugged in to the cartridge port 27. The battery 71 may be a long-life replaceable type or alternatively may be a rechargeable battery which is recharged each time the cartridge 26 is plugged into the cartridge port 27.

The CPU 65 is also connected via bus 66 to the ROM 75 which contains an interpreter program made up of microprogram routines for allowing the CPU 65 to interpret, execute and edit the instructions of the control program stored in the cartridge 26. The CPU 65 is further connected to the scratchpad RAM 77 by bus 66.

The CPU 65 is also connected by means of parallel bus 66 to the serial interface circuit 80 which is connected by means of a serial interface line 79 to a microprocessor 81. The microprocessor 81 may consist, for example, of a model 8051 microprocessor manufactured by Intel. The microprocessor 81 is connected to the keyboard input port 17 of the host computer 11 through the interface circuit 83 and to the host computer keyboard 15 through an interface circuit 85. The host computer interfaces circuit 83, host keyboard interface circuit 85, and the microprocessor 81 may all reside in a plug-in module 73, unique for each type of host computer for adapting the I/0 device 19 to work with different host computers.

The microprocessor 81 receives inputs from the keys on the top face 29 of the I/0 device 19 through the keyboard interface circuit 87 and sends signals via the parallel bus 79 to the serial interface circuit 80. The CPU 65 fetches the information from serial interface 80 via parallel bus 66. The CPU 65 then accesses the control program in the ROM 67 or RAM 69 and the interpreter program in the ROM 75 via parallel bus 66 to determine things such as what new display information should be transmitted to the LCD displays 33, 35 and 41 and what keystroke information should be transmitted to the host computer 11. The CPU 65 transmits data to the microprocessor 81 via data bus 66, the serial interface circuit 80 and the parallel bus 79. Microprocessor 81 transmits display data via the parallel I/0 bus 89 to the display drivers 91, 93 and 95. The LCD drivers 91, 93 and 95 are normally physically integrated with the LCD displays they control. The microprocessor 81 transmits keystroke data via host computer interface 83 to the host computer 11.

Also connected to the parallel I/0 bus 89 are driver circuits 97 for a light emitting diode 99 which could conveniently be mounted in the front face 29 of the device 19 to indicate whether or not it is receiving power from the host computer 11. The driver circuit 97 also control the operation of the "more" indicator LED 38, the preview indicator LED 60 and the atrophy indicator LED 66. Driver 101 for speaker 1? 3 is connected to the I/0 bus 89 and receives signals from the microprocessor 81 to indicate such things as the depression of a key on the top-face 29 or an error condition. The speaker 103, may for instance, be mounted to a speaker grill (not shown) on the back panel of the I/0 device 19. Also positioned on the back panel may be a switch (not shown) for controlling the volume level of the speaker.

A data input/output circuit 104 may also be connected to the parallel bus 66 if desired for allowing the I/0 device in accordance with the invention to receive information from the host computer 11 through an input/output port 106. The information received may be stored in the RAM 69 in the cartridge 26 or in the RAM 77. The capability to receive data from the host computer 11 allows the I/0 device 19 to control the Target Program in an interactive manner by interrogating the host computer 11 via the interface 83 and receiving the response at input port 106. Information may also be transmitted by the I/0 device 19 via the circuit 104 to the host computer or other storage device for backup or other purposes.

Figure 4:
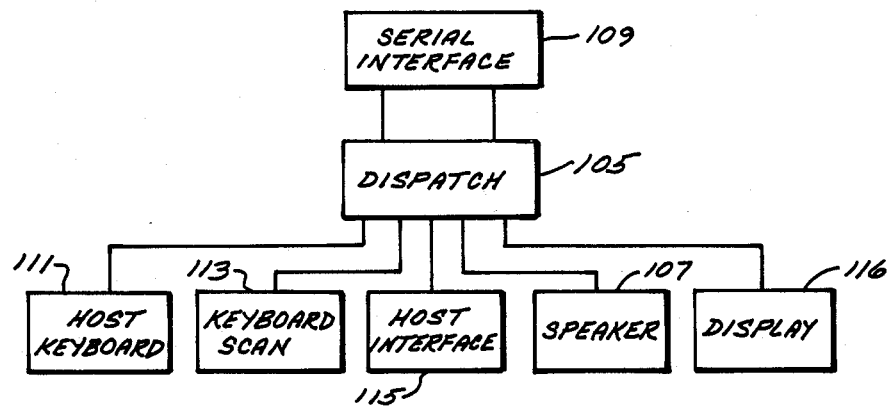
FIG. 4 is a block diagram showing the software routines which reside in a microcomputer shown in FIG. 3.

FIG. 4 is a block diagram showing the software routines that move information to and from microprocessor 81. The main routine which controls the flow of data and control signals in microprocessor 81 is called the dispatch routine illustrated by block 105. The dispatch routine controls the receipt by microprocessor 81 of data and control signals from the CPU 65 through the input buffers contained in the microprocessor 81 by means of the serial interface routine indicated by block 109. The dispatch routine 105 controls the receipt of keystroke codes from the host keyboard 15 by means of the host keyboard input routine 111 and controls the receipt of signals from the keyboard on the top-face 29 of the I/0 device 19 through the keyboard scan routine 113. Keystroke codes are sent under the control of the dispatch routine 105 to the host computer 11 via the host computer interface routine 115. The dispatch routine 105 also controls the transmission of sound data to the speaker driver 101 by means of the speaker routine 107 for controlling the speaker 103 and controls the transmission of display data by means of the display routine 116 for displaying information on the LCD's 33, 35 and 41.

In utilizing the I/0 device 19 to control the execution of a Target Program on the host computer 11, the user selects the desired options from those presented in displays 33 and 35 (FIG. 2) by operating one of the selection keys 37 or 39; and also controls the movement of the cursor or windows on the host computer display 13 by means of the pointer keys 43 and 45, the domain keys 55 and the associated keys 47, 49, 51 and 53. The message display 41 is used to give the user information about the operation of the Target Program to convey messages to the user which require some action other than selecting an option with the selection keys 37 and 39. Such actions might include entering of data on the host computer keyboard 15, putting paper in the printer or inserting a floppy disc into a disc drive associated with host computer 11 The message display 41 is also used during the editing mode to display the commands of the control program stored in the ROM 67.

The microprocessor 81 is responsible for controlling the flow of data and instructions from the host computer keyboard 15 to the host computer 11 and from the keys on the front-face 29 of the I/0 device 19 to the CpU 65. Microprocessor 81 also manages the transmission of keystroke codes from the CPU 65 to the host computer keyboard port 17 and controls the displays 33, 35 and 41 and the speaker 103.

The CPU 65 executes the control programs stored in the cartridge 26 and generates the keystroke commands to be sent to the host computer 11 through the microprocessor 81. It is important that the execution of the control program by the central processing unit 65 remain in synchronism with the operation of the Target Program on the computer 11, since the central processing unit 65 receives no information from the host computer 11 on the current status of the Target Program operation other than data that might be received through input port 106. The I/0 device 19 prevents the user from sending inappropriate keystroke commands from the computer keyboard 15 to the host computer 11 which might for instance, disrupt the synchronization or cause some other fault condition, by intercepting the keystroke commands in the microprocessor 81 and transmitting those keystroke codes to the central processing unit 65 by way of the serial interface 79. The CPU 65 retransmits the keystroke code to the microprocessor 81 for transmission to the host computer 11 only if the keystroke code is an appropriate one. If the user attempts to send an inappropriate keystroke code, the central processing unit 65 sends an audible error signal to the speaker driver 101 through the microprocessor 81.

The dispatch routine 105 (FIG. 4) is the main processing loop of the microprocessor 81 and coordinates the execution of the other driver routines in the microprocessor 81. A flow chart of the dispatch routine for the illustrated embodiment of the invention is illustrated in the block diagram of FIG. 5 of the drawings. Beginning at the top of the FIG. 5 flow chart, the dispatch routine causes the keyboard scan routine 113 to scan the keys of the I/0 device keyboard 19 as indicated in block 117. If a key is pressed the dispatch routine 105 transmits the keystroke code to the output section of I/0 buffer in the microprocessor 81 as indicated in box 119. If no key has been pressed, the step 119 is skipped. Next the dispatch routine 105 calls the host keyboard input routine 115 as illustrated in block 121 to determine whether a key has been pressed on the host keyboard 15. If a key has been depressed, the keystroke code is transmitted by the dispatch routine 105 to the output section of I/0 buffer as indicated in block 123. If no key has been pressed on the host keyboard 15, the step 123 is skipped. The dispatch routine 105 next checks the status of the output section of the I/0 buffer as indicated in block 125 and if there is anything stored in the output buffer, the serial output routine is called as indicated in block 127. Two bytes of information, representing one keystroke code from the host keyboard 15 or a keystroke code generated by the actuation of a key on the I/0 device keyboard 19 is transmitted to the CPU 65 over the serial interface line 79. If there are more than two bytes of information in the output section of the buffer, the next two bytes of information are sent to the CPU 65 on the following cycle of the dispatch routine. If the output buffer had been empty, the step 127 would be skipped.

Next, as indicated in block 129, the dispatch routine checks the input section of the I/0 buffer and if there is information from the CPU 65 stored in the I/0 buffer, the dispatch routine pulls two bytes of information from the I/0 section of buffer as indicated by the block 131 and examines the first of the two bytes to determine what kind of information the bytes constitute. The dispatch routine 105 first determines whether the information is host keystroke data as indicated by block 133 and, if it is, calls the host computer interface routine 115 as indicated by the block 135, which transmits the keystroke code to the host computer 11.

If the two bytes of information are not keystroke data, the dispatch routine determines whether it is sound data as indicated by block 137. If it is sound data, the dispatch routine determines what type of sound the data corresponds to, as indicated in block 139 and calls the speaker driver routine 107, as indicated in block 141, to send the appropriate sound signal to the speaker driver 101 (FIG. 3.). If the information is neither keystroke data nor sound data, it must be display data for the LCD displays 33, 35 or 41. Therefore, the dispatch routine 105 calls the display driver routine 116 as indicated in block 143 which sends the information to the proper one of the display drivers 91, 93 or 95.

Figure 6:
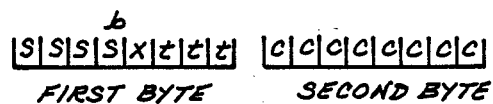
FIG. 6 shows the format of a 2 byte data code used in the I/0 device of the illustrated embodiment of the invention.

If the 1/0 buffer had b(R)en empty as indicated in block 129 or after executing the appropriate driver routine for keystroke, sound or display data, the dispatch routine returns to the keyboard scan routine 113 as indicated in block 117 to begin another cycle of operation. The dispatch routine may be interrupted by an interrupt signal from the CPU 65 which calls a serial I/0 routine to allow the CPU 65 to transmit two bytes of data to the input section of buffers 109. The dashed lines around block 131 indicate that the interrupt is disabled during the execution of the routine indicated by that block FIG. 6 shows the data format of the 2 byte information code in the input register section of the I/0 buffer in the microprocessor 81. The "S"s in the first 4 bits of the first byte indicate a sound identification number which is used only for sound data. The "b" in the fourth place of the first byte is used only in connection with the displays 33, 35 and 41. When b is one it specifies that the character to be display should blink and when zero specifies that the character should not blink. The "X", in the fifth place of the first byte is also only used in connection with the LCD displays 33, 35 and 41. When equal to zero it indicates the contents of the second byte is a character to be displayed in one of the liquid crystal displays 33, 35 and 41 and when equal to 1 indicates that the information in the second byte specifies the position in the LCD displays 33, 35 and 41 where the character specified by the next display data code is to be displayed.

The three "t"s in the 5th through 8th place of the first byte, depending on their value, specify whether the 2 byte code is sound data, keystroke data, or data for the displays 33, 35 or 41 and if it is display data, specify which of the three displays, 33, 35 or 41 is to be affected and whether the 2 byte character is for controlling the cursor in the LCD displays 33, 35 or 41. The 8 C's of the 2nd byte specify the particular ASCII character code or cursor position if the "t" codes of the first byte specify that the 2 byte code contains display data, or, if the three "t's" specify that the 2 byte code is keystroke data, specifies the 8-bit keystroke code which is to be transmitted to the host computer 11.

Figure 7:
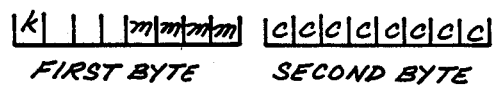
FIG. 7 shows the format of another 2-byte data code used in the I/0 device of the illustrated embodiment of the invention.

The data in the output portion of the I/0 buffer is also formatted in a 2 byte code as illustrated in FIG. 7 of the drawings. When the "K" in the first bit of the first byte is equal to 0 the data came from the host keyboard 15 and if equal to 1 indicates the data came from the I/0 device 19 keyboard. The "M"s in the last four bit places of the first byte are flags for identifying certain of the keys on the I/0 device 19 keyboard or edit drawer. The 8 "C"s in the second byte correspond to the 8 bit keystroke code from the host keyboard 15 or from the keys of the I/0 device 19.

In the preferred embodiment of the invention, the control program in the cartridge 26 is written in a language referred to as KLISP, which has been developed by Applicants for use in the present invention. The KLISP language consists of a set of commands which perform various tasks to assist the user in the utilization of an application program. These tasks include such things as displaying messages in the message display 41, generating sounds with the speaker 103, displaying the names of options in the label displays 33 and 35, sending keystrokes commands to the host computer 11 and moving around within the KLISP program.

The KLISP language is particularly efficient for writing programs controlling the display of menus and subsets of menus for the user to select from and in generating keystroke codes that the host computer !1 requires to execute the application program. Each KLISP command is a single task such as "Display Message", "Send Keystroke", "Make Sound".

The notation for a KLISP source code command as seen in FIG. 8 of the drawings begins with a 3-character command abbreviation which specifies the task to be carried out: followed by a command argument of a variable number of characters. For instance in FIG. 8 the command abbreviation LBL of the second command designates a "Label" command which specifies that the command argument is the name of an option to be displayed in one of the sections of the selection key label displays 33 and 35 (FIG. 2). The command abbreviation (KEY) in the third command in FIG. 2 is a keystroke command which orders the CPU 65 to send the keystroke codes specified in the command argument to the host computer 11 by means of the microprocessor 81. In this case, the command argument orders the CPU 65 to send the keystroke codes corresponding to the depressions of the "R" and "Return" keys on the host keyboard 15 to the host computer 11. A single KEY command can order the transmission up to five keystrokes to the host computer 11. The significance of some of the other commands in the KLISP language is described in more detail below.

A KLISP program design can be visualized as a set of upside down trees each having a plurality of branches with each branch usually splitting into further branches. Each branch is made up of a list of commands called a procedure. As shown in the example of FIG. 8 each procedure is headed by a PRC instruction. The argument of the PRC instruction specifies the procedure number. Following the PRC instruction in a procedure is a label command identified by the source code abbreviation LBL. The argument of the LBL command specifies the names of the procedures. Execution of a procedure by the CPU 65 continues until another label command is reached. A label command always stops the execution of a procedure. When a label command is encountered, the name in the argument is displayed in one of the sections of the key label displays 33 and 35 as the name of an option available to the user and the KLISP program execution is halted. If the user selects a procedure by depressing the selection key 37 or 39 associated with the section of the display 33 or 35 displaying the procedure name, all of the commands in the procedure are executed by the CPU 65 in the order in which they are listed until a next label command is encountered.

The procedures corresponding to the set of options available to the user at a given point in the execution of a Target Program on the host computer 11 are grouped in selection groups which constitute the nodes or points at which the trees branch. Each selection group calls up the appropriate set of procedures corresponding to the options available to the user at that point in the execution of the Target Program by the host computer 11. The label command arguments at the beginning of each of the procedures of the selection group are presented to the user by being displayed in the various sections of the selection key label displays 33 and 35. If there are more options available at a point in the execution of the Target Program than can be displayed on the display 33 and 35 at one time, the "more" indicator light 38 is illuminated. To display the additional available options the user depresses the "more" key 40. To restore the initially displayed options to the display 33 and 35 the user depresses the "more" key 40 a second time. The user selects one of the procedures by depressing the selection key 37 or 39 corresponding to the section of the display 33 or 35 in which the name of the procedure is displayed.

A KLISP selection group routine is illustrated in FIG. 9 of the drawings. The first instruction abbreviated "SGP" is the instruction that specifies a selection group. The instruction argument, in this case "8", specifies the number of the selection group. The second instruction of the selection group identified by abbreviation "LNK" is the link instruction which tells the CPU 65 to display the names of the procedures specified by the link instruction argument. In the example shown in FIG. 9 the link instruction tells the CPU to display the names of the procedures 33, 34, 35, 36, 37 and 38.

The third instruction of the selection group having the abbreviation "POS" specifies in which of the ten sections of the selection key label displays 33 and 35 the names of the procedures are to be displayed. The ten sections may be considered as being numbered 0 through 9. If the name of the procedure is more than sixteen characters long, two adjacent sections of a display 33 or 35 can be joined to have one double length section. This is specified in the POS instruction by putting "10" before the number of the first of the two sections to be joined. Thus the number 103 in the argument of the POS instruction in FIG. 9 specifies that the name of procedure number 36 is to be displayed in the fourth and fifth sections of the upper selection key label display 35. The number 105 in the argument of the POS instruction specifies that the name of procedure number 37 should be displayed in the first and second sections of the lower selection label display 35.

The "ATR" instruction of the selection group specifies which of the labels in the selection group should not atrophy. The atrophy function is described in more detail below.

The selection group instruction abbreviations referred to above SGP, LNK, POS, and ATR and the Procedure identifying instruction abbreviation PRC are used for ease of description only since it is not necessary ever to display these instructions to the user. Thus these instruction codes are present in the input device 18 and the cartridge 26 only as internal object code.

If the last command in the procedure is either a "JSG" command, or a "JPR" command the execution will "jump" to another part of the KLISP program. The JSG command tells the CPU 65 to jump to the selection group whose number is identified in the argument of JSG command. The JPR command tells the CPU 6 to jump to a specified line of the procedure specified in the argument of JPR command. For instance, the argument of JPR command may be "NAME FILE, 3" which tell the CPU 65 to jump to the third line of the name file procedure. If the procedure ends with other than JSG or JPR, the CPU 65 returns to the selection group which was displayed at the time the procedure was selected by the user.

When the I/0 device is first powered up, or when a new cartridge 26 is inserted into the port 27, a procedure referred to as the "Initial Procedure" is automatically called up which contains the initialization commands. These commands allow the control program in the cartridge to be identified by the CPU 65 and permits the user to type his name using the keyboard 15. The name is stored in the cartridge 26 for subsequent display in the message display 41. The initial procedure ends with display of the first selection group whose labels represent the top or initial part of the trees (procedures) of the KLISP control program. This set of labels allows the user to select and activate the first group of procedures.

A label displayed in selection key label display 33 or 35 can be made to "toggle" by combining two of the features of the KLISP language. Toggling is when one label position alternates between two or more procedures. By putting a second label command into a procedure the procedure stops at that point and replace its current label in the selection key label display 33 or 35 with the second label. If the associated selection key is pressed for the second label the second part of the procedure is then executed. In order to toggle the display the procedure should end with a jump to the label command that initiated the procedure which causes the second label to be replaced by the first label in the selection key display 33 or 35. Thus if the user repeatedly pushes the same selection key the label switches back and forth between the first and second labels.

As stated above the KLISP instructions can be of variable length. The format of the KLISP instruction as stored in the ROM 67 includes a first byte encoded to specify the particular command. Since a byte contains eight bits the illustrated embodiment of the KLISP program can have a total of 256 different commands and instructions. Each eight bit command code corresponds to one of three character command abbreviations as displayed in the message display during edit mode. The second byte specifies the length in bytes of the KLISP command. The remaining bytes of the command constitute the command argument field.

In the illustrated embodiments of the invention the CPU 65 implements the addressing of selection groups and procedures of the KLISP control program stored in the ROM 67 by establishing selection group and procedure look-up tables in the RAM memory 69 contained in cartridge 26. When the I/0 device 19 is first powered up, or the cartridge 26 is inserted in the cartridge port 27, the CPU 65 scans the control program, locates each SGP instruction and stores the address of the following command in the selection group look-up table in association with the number of the selection group. In like manner the CPU 65 locates the PRC instructions which precede the label command in each procedure. The argument of the PRC instruction specifies the number of the procedure. The CPU 65 stores the address of the label command following the PRC instruction in the procedure look-up table in association with the number of the particular procedure.

When executing a JSG command the CPU 65 looks in the selection group look-up table to find the address stored therein in association with the number of the desired selection group which directs it to the address of the link instruction following SGP instruction. In executing the LNK instruction, the CPU 65 looks in the procedure look-up table to find the addresses stored therein in association with the numbers of the desired procedures. These addresses cause the CPU 65 to go to the label instructions following each of the desired PRC instructions. The labels are then displayed in the display positions specified in the POS instruction.

In executing a JPR command the CPU 65 looks in the procedure look up tables to find the address of the procedures specified by the command argument and jumps to the lines of the procedure specified by the JPR command.

The atrophy function is used to customize a KLISP program according to a "use profile" of a particular user. As the user repeatedly utilizes that KLISP program; labels (and their associated procedures) that are not used begin to "vanish" from the displays 33 and 35. These vanishing labels are not lost, they are simply removed from sight so that the user has fewer decisions to make. Atrophied labels can be viewed and restored with the restore mode.

Referring now to FIG. 10 of the drawings, each selection group has an atrophy counter table associated with it stored in the RAM 69 in cartridge 26. The counter 145 is initially set to a predetermined number which in the illustrated embodiment is arbitrarily chosen as "10", and is decremented each time the selection group is left. The atrophy table for each selection group may be thought of as having a number of columns corresponding to the number of procedures contained in the selection group and as having a first row 147 which contains used flags that are set when the corresponding procedure is selected. The second row 149 contains non-atrophy flags which can be set manually by the user by use of the non-atrophy mode which prevent the atrophying of the corresponding procedure. The third row 151 contains the atrophy flags which designate which of the procedures have been atrophied. The fourth row 152 indicates labels that have been atrophied and then restored. These labels will atrophy again at a faster rate until they are used again.

In the illustrated embodiment of the invention when the atrophy counter 145 associated with a particular selection group is decremented to three, the displays 33 and 35 begin to blink the sections containing the names of the procedures whose used flags have not been set to indicate by that they are in danger of being atrophied. When the counter 145 is decremented to zero the atrophy flags are set in row 151 for any procedure for which neither a used flag nor a non-atrophy flag is set. The atrophy counter 145 is then reset to 10 and the used flags in column in 147 are reset. The atrophy function continues with the counter 145 being decremented as before and atrophy flags being set in column 151 each time the counter 145 reaches zero for any procedures which has not been used since the atrophy counter 145 was last at its maximum value. Since the atrophy counter 145 and atrophy table are stored in the battery backed up RAM 69 in cartridge 26, the atrophy process continues even if the cartridge 26 is removed between sessions.

If all but one procedure of a selection group has been atrophied the remaining one is chosen automatically and executed with the effect that one branching point or node of the tree is eliminated. This means that there is one less decision for the user to make thereby simplifying the use of the I/0 device 19. This "drop-through" function will not be implemented if the procedure to be automatically selected ends with a JSG command that jumps to the same selection group.

There are some conditions which may occur in the Target Program being executed on the host computer 11 that change the way a particular procedure should act. For example in the Lotus 1-2-3 program, the number of escape (esc) key presses needed to get to a particular menu is different after a file has been saved. In order to compensate for these changes in conditions some of the KLISP procedures must act differently after the change has occurred. The situation is handled in the I/0 device 1 in accordance with the invention by having alternate procedures. Alternate procedures are made by having two or more procedures each with a unique PRC instruction argument number, share the same procedure name in the argument of the label command. As seen in line 5 of the procedure shown in FIG. 8 the alternate procedure function is implemented by an ALT command which tells the CPU 65 to replace the address stored in the procedure lookup table of the procedure whose number is specified in the first number of the argument of the ALT command with the address of the procedure whose number is in the second place of the ALT command argument. In executing the ALT command shown in line 5, the CPU 5 scans through the KLISP control program in the ROM 67 to find the PRC 28 instruction and replaces th Ⓡaddress stored in the procedure look-up table in RAM 69 corresponding to procedure number 6 with the address in the ROM 67 of the LBL command following the PRC 28 instruction. Thus when a selection group subsequently calls procedure number 6 the argument of the label instruction in procedure 28 is displayed in the display 33 or 35 and the selection of that procedure causes procedure number 28 to be executed instead of procedure number 6. Similarly when a JPR command calls procedure number 6 the specified line of procedure 28 is executed.

If at a later time during the execution of the Target Program on the host computer 11 the condition changes once again, a second alternate procedure or the original procedure may be required. In such case, the ALT command is executed once again in the same manner as described above. To restore the alternate procedure to the original one, an ALT command of the type shown on line 9 in FIG. 10 is executed. In this case the CPU 65 scans the KLISP control program in the ROM 67 to find the PRC 4 instruction and substitutes the address of the following LBL command in the procedure look-up table at the location corresponding to procedure number 4.

During editing, a visual indication can be given in the display 33 or 35 to indicate that an alternate procedure would be activated by the depression of the corresponding selection key 37 or 39. Such an indication could for instance be an apostrophe following the name of the procedure for a first alternate or two or three apostrophes indicating a second or third alternate respectively.

The alternate procedure function is used in connection with domain keys 55 for making the outer arrow keys 45 (FIG. 2) move the Target Program cursor or window by an amount selected by the user. There is a set of procedures associated with the arrow keys 43 and 45 which may be included in the procedure look-up table described above or in a separate arrow key look-up table. The actuation of one of the domain keys 55 calls a procedure which executes an alternate command for each of the outer arrow keys 45 to tie them to the procedures corresponding to the selected domain key 55. Thus the actuation of one of the arrow keys 45 causes the CPU 65 to generate a set of keystroke commands to be sent to the host computer 11 to move the cursor or window in the selected direction by the amount specified by the selected domain key 55.

In addition to executing the KLISP program stored in the ROM 67 with the aid of the interpreter ROM 75, the CPU 65 performs other tasks such as filtering keystrokes entered on the host computer keyboard 15, controlling the exchange of data between itself and the microprocessor 81 and a number of other functions. The program routines for implementing these additional functions may be written in another programming language such as, for instance, a Z80 assembly language compiled from "C".

The keystroke filter is implemented by means of a set of filters or keystroke designations stored in the ROM 67 or RAM 69 (FIG. 3) which may designate the keystroke codes that either may be, or may not be transmitted to the host computer 11. Normally each filter lists the shorter of the permitted or excluded key strokes designations. The particular filter is selected by the KLISP control program by means of a FLT command illustrated at line 11 of the procedure source code listing of FIG. 8. The argument of the FLT command specifies the number of the filter to be applied. The filter selected can be changed as appropriate during the execution of the KLISP program by FLT commands in the KLISP program designating the desired filter.

When a key is struck on the keyboard 15 the corresponding keystroke code is received by the microprocessor 81 and sent to the CPU 65 where it is compared with the keystroke designations of the currently selected filter. Only if the keystroke code is one of the permitted ones is it transmitted back to the microprocessor 81 for transmission to the host computer 11. If a forbidden keystroke use is indicated by the filter, the CPU 65 operates through microprocessor 81 to generate an audible error signal.

Figure 11:
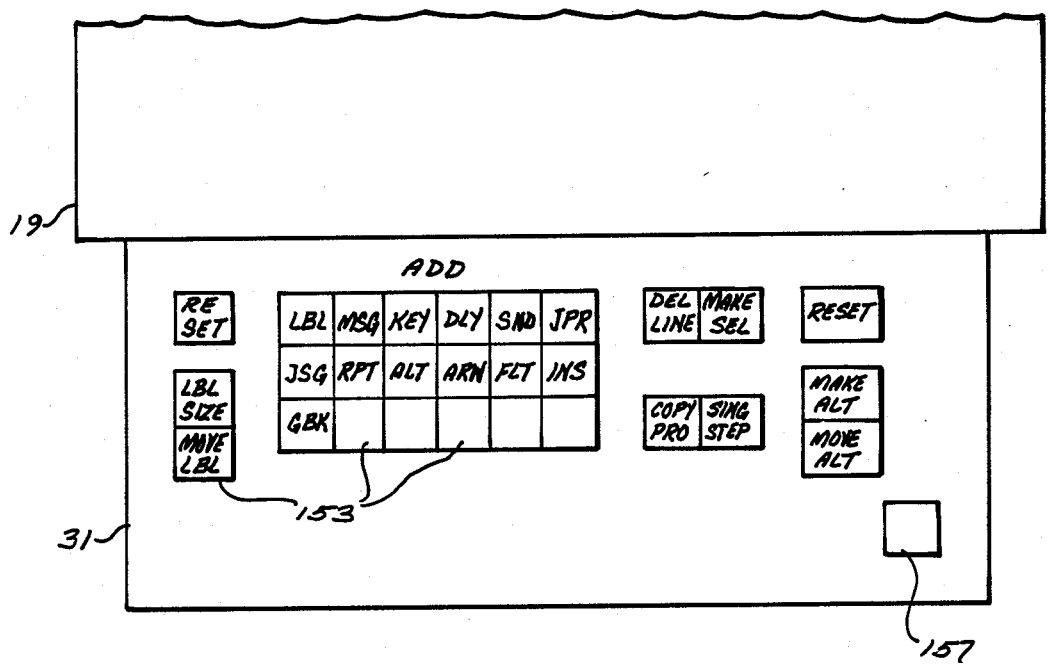
FIG. 11 is a top view of the edit drawer extended from the I/0 device in accordance with the illustrated embodiment invention.

Referring now to FIG. 11 of the drawings, the editing drawer 31 is extended from the I/0 device 19 to allow access to the editing keys 153. Pressing the edit mode key 157 switches the I/0 device to the edit mode. Actuation of the keys 153 implements KLISP editing functions which modify and add to the KLISP program residing in the cartridge ROM 67. All modifications and additions to the KLISP program are stored in the RAM 69.

Existing procedures and selection groups can be modified by moving under the control of the editing keys and arrow keys 43 and 45 on surface 29 to a particular selection group and to the desired procedure within that group. Any of the editing functions can then be used to modify the selection group or procedure.

In the illustrated embodiment of the invention, the commands of the selection group or procedure being modified are displayed in the two lines of the message display 41. For instance if it is desired to add a line to a procedure the user would display the line above the location where it is desired to insert a command in the top row of the message display 41 and the line below the location where the command is to be inserted in the second line of message line 41. The edit key 153 commanding the addition of the particular type of command is then depressed and the 3 letter source code command abbreviation is automatically generated. Th command argument is then entered from the host computer keyboard 15. This inserted command is displayed in the top line of the message display 41. The line following the inserted line continues to be displayed in the bottom row of the message display 41.

The various editing keys 153 provide for the selection of operations including such things as adding label commands, adding keystroke commands, adding sound commands, adding various jump commands, changing the functionality of the arrow keys 43 and 45, modifying the operation of the keystroke filter commands, and in general making whatever changes the user desires to the KLISP control program.

The operation keys 153 are shown in FIG. 11 as being arranged in a simple array of rows and columns. It is of course equally possible to group the keys 153 into various related operational groups and to have more or fewer keys. The editing mode is of use mostly to experienced users of the I/0 device 19 who understand the structure and operation of the KLISP control program, but do not have to have programming experience. As such, the editing keys would normally not be used by the inexperienced or occasional user of the I/0 device 19. Therefore, in order to reduce costs, it may, in some applications be preferable to incorporate the editing keys and related circuitry into a separate module which can be plugged into the I/0 device 19 when it is desired to edit the KLISP control program resident therein.

In the edit mode arrows key 43 and 45 control the display of the KLISP control program instructions in the message display 41 and allow the user to move around within the control programs. The inner arrow keys 43 control the movement within a procedure with the inner vertical arrow keys controlling step by step movement through the instructions of the procedure while the inner horizontal arrow key allow cursor movement and scrolling of the message display 41.

The outer arrow keys 45 permit movement within or between selection groups. The outer horizontal arrow keys cause movement among procedures of a selection group, while the outer vertical keys arrow cause movement to preceding or following selection groups.

An alternative method of adding new procedures to a KLISP selection group is by entering the "custom key" mode by depressing the ON/OFF key 161 when the desired selection group is displayed by the displays 33 and 35. In this mode the user first selects an available label location in the displays 33 or 35 by moving a cursor that appears at this point under the control of the CPU 65 in the first label location of the display 33. The curse is moved to any vacant label location by the arrow keys 45 which, during this first portion of the "custom key" mode, operate on the displays 33 and 35 rather than on the host computer display 13 as they do normally.

The operator indicates the selection by depressing the record key 163 which causes the device 19 to enter a second phase of the "custom key" mode. The operator then types in the text of the label on the host keyboard 15, after which he depresses the record key 163 a second time. The label text appears in the selected location as it is typed.

The second actuation of the record key 163 causes the device 19 to enter a third phase of the "custom key" mode in which the operator builds the new procedure by actuating keys on the host keyboard 15 and the I/0 device keyboard 29 in the proper sequence to perform the desired procedure followed by a third actuation of the record key 163. The entered keystrokes are executed as they are entered. In this third phase the arrow keys 45 operate in their normal manner to control the cursor or windows on the host computer screen 13.

The actuation of the ON/OFF key 161 to enter the "custom key" mode causes the CPU 65 to record a PRC instruction in an available portion of the RAM 69 and to record in the procedure look-up table the address at which it is stored. Following the PRC instruction in the RAM 69, the CPU 65 records a LBL instruction whose argument is the label text typed by the operator during the second phase. The actuation of keys during the third phase causes the CPU 65 to generate the instructions of the procedure which make the I/0 device 19 mimic the action of those keys when the corresponding selection key is actuated during the later use of the system. The actuation of letter keys on the host keyboard 15 causes the CPU 65 to store a KEY command as part of the procedure with the codes of successively depressed keys making up the argument of the command. The actuation of a key on the keyboard 29 causes the CPU 65 to store a PRS command in the RAM 65 with the codes identifying the successively depressed keys making up the argument.

Any of the keys on the I/0 device 19 keyboard 29 may be entered with the exception of the ON/OFF and record keys 161 and 163, including the selection keys 37 and 39. Thus, a "custom key" procedure can incorporate other procedures and even other earlier-recorded "custom key" procedures. This feature of the I/0 device 19 in accordance with the invention is particularly useful when the operator has to perform a set of tasks repeatedly during the use of a program. If the operator needs to enter variable data at some point during a "custom key" procedure, it is necessary to break the procedure at that point and, if desired, to begin a second "custom key" procedure after entering the variable data.

Another important feature of the I/0 device 19 in accordance with the invention is what is referred to as the "trigger function". This feature allows the I/0 device 19 selectively to treat any of the keys of the host keyboard 15 as a selection key, so that its actuation calls up a corresponding procedure. When the I/0 device 19 is powered-up, the CPU 65, in addition to the procedure and selection group look-up tables, also establishes a scan code look-up table in the RAM 69 which stores the codes generated by the actuation of each of the keys of the host keyboard 15. In association with each of the scan codes in the table there is stored a code that is normally blank, but which, under the control of the KLISP program in the ROM 67, can identify a selected procedure in the procedure look-up table. Each time the CPU 65 receives a host keyboard scan code from the microprocessor 81 through the serial interface 80, it checks the keystroke filter then in place as described above, and then checks the scan code look-up table. If a blank code is stored in the table in association with the scan code corresponding to the received scan code, the received scan code is transmitted to the host computer 11, so long as the filter is not set to block the transmission. If a code is stored in association with the scan code, the CPU 65 executes the procedure identified by the code no matter whether the filter is set or not. The KLISP program selectively sets the codes in the scan code look-up table by means of the Assignment Instruction identified by the code ASI. Following the ASI code in the instruction is the scan code of the key being assigned and the number of the procedure to be executed. The scan code settings can be changed or blanked as desired during the execution of the KLISP program by further Assignment Instructions.

The trigger function not only increases the number of available selection keys, but, more importantly, also allows the I/0 device 19 to track the user's actions on the host keyboard 15. For instance, the actuation of the Enter key at the end of a series of characters can be interpreted by the KLISP program as an instruction to go to the next selection group or to take some other appropriate action.

The modifications to the KLISP control program are stored in the RAM 69 in the cartridge 26. As described in part above, the CPU 65 stores look-up tables in the RAM 69 for use in addressing the procedures and selection groups of the KLISP control program stored in the ROM 67. CPU 65 uses these look-up tables in conjunction with a program counter implemented by the CPU 65 in the RAM 77 for keeping track of the address of the next instruction to be executed by the CPU 65 in ROM 67 or RAM 69. Thus, when the CPU 65 comes to a procedure or selection group which has been modified by the edit functions, it executes the modified portions in the RAM 69 before going back to the proper place in the ROM 67 to continue the execution of the KLISP control program.

The RAM 69 in the cartridge 26 can reset to its initial state by using the Reset function accessible from the editing drawer 31. In order to prevent the RAM 69 from being reset accidentally, it is preferable to require that two well separated keys 153 be actuated simultaneously in order to implement the Reset function.

For Target Programs such as Lotus 1-2-3 which have an internal macro-instruction capability, it is possible to use the KLISP control program to load macro-instructions into the Target Program on the host computer 11 by sending an appropriate series of keystroke codes to the host computer 11 and then to call up the macro-instruction later during the execution of the control program. This capability can significantly increase the efficiency and power of the KLISP program, particularly in situations where the Target Program has the capability of modifying the macro-instructions during its operation.

As mentioned above in reference to FIG. 1, the cartridge slot 25 is preferably capable of receiving two or more cartridges 26 at one time. The other cartridges could be used, for instance, to provide an increased amount of ROM for storing an extra large KLISP control program or for storing a second KLISP program. Also, if the battery 71 is a rechargeable type, the inserting of a cartridge into the second position in port 25 can be done to recharge the battery 71.

Applicant's invention has been described with relation to his preferred embodiment. It is however, possible to make a number of changes in the implementation of applicant's invention without departing from its scope and spirit. For instance, the look up tables and the atrophy tables stored in RAM 69 of the preferred embodiment might also be stored in an internal memory in the I/0 device 19 which might allow one to do away with the requirement of a battery back-up 71 in each cartridge 26 and a single battery could be included in the input device 19. The trade-offs in doing this however might not be favorable since a greater amount of internal memory would likely be required and its practicality may depend on the number of application programs and users that is necessary to accommodate. The RAM 69 and battery back-up 71 could also be replaced by another form of read-write, non-volatile memory such as a bubble memory.

Although, the keystroke code filter has been described as being implemented in CPU 65, it might also be handled by microprocessor 81 depending on the needs of the system. The cartridge 26 can be of any convenient size and shape and in some cases could look like a thick credit card with edge connectors. While the KLISP control program of the illustrated embodiment is stored in a ROM, other types of memory media could also be used such, as a battery backed-up RAM or magnetic storage device such as a disc drive, so long as they are suitable for use as an interchangeable medium for storing control programs. If desired, the connection between the cartridge 26 and the parallel bus 66 can be by an optical or infra red link in order to avoid problems with electrical discharge.

In another embodiment, a CRT with a touch screen may be used instead of LCD's and push button switches. Also, transparent membrane switches overlaying the LCD may be used instead of push button switches in conjunction with the LCD or any other displayable switch scheme.

What is claimed is:

1. An interactive intelligent computer I/O device for permitting a user to control the execution of a selected target program on a host computer, said host computer having a keyboard port for connecting a keyboard to the host computer, said target program providing to the user groups of tasks, each of said groups of tasks being provided at a different point during the execution of the target program, each of said tasks being identifiable by a task name and each of said tasks being performable by the target program at the point in the execution of the target program that the group of tasks including the task is provided, wherein the user may direct execution of a particular task of the group of tasks provided by transmitting a particular set of keystroke codes to the host computer; comprising;

host computer interface means for connecting the I/O device to the keyboard port of the host computer so that information may be transmitted between the I/O device and the host computer;

interchangeable memory means for providing a stored control program to condition the I/O device to control the execution of the selected target program, said control program providing to the user groups of procedures, each of said groups of procedures corresponding to one of the groups of tasks provided by the target program, each of said procedures of the group of procedures corresponding to one of the tasks in the corresponding group of tasks provided by the target program, wherein each procedure may be identified by the task name of the task corresponding to the procedure;

first processing means for executing the control program and for synchronizing execution of the control program with execution of the target program so that each group of procedures is provided by the control program to the user at the point in the execution of the target program that the group of tasks corresponding to the group of procedures is provided to the user by the target program;

display means, responsive to the control program, for presenting groups of procedures to the user, said display means having a plurality of sections wherein each section presents a procedure of the group of procedures and each section is identified by the task name of the task corresponding to the procedure;

means for selecting a procedure from the group of procedures presented by the display means, said means for selecting being actuable to provide a signal indicative of the procedure selected;

second processing means, responsive to the selection signal, for generating sets of keystroke codes to direct the execution of the task corresponding to the procedure selected; and third processing means for transmitting the set of keystroke codes from the I/O device to the host computer to direct the execution of the task corresponding to the selected procedure.

2. The device of claim 1, wherein the interchangeable memory means comprises a read only memory for storing the control program and a nonvolatile read/write memory for accepting input from the user.

3. The device of claim 2, wherein the nonvolatile memory includes a random access memory.

4. The device of claim 1 wherein the display means comprises a liquid crystal display.

5. The device of claim 4, wherein the selecting means comprises a plurality of selection keys, wherein each selection key is associated with a different section of the display means and actuation of a particular selection key provides a signal indicating selection by the user of the procedure presented by the associated section of the display means.

6. The device of claim 4, wherein the selection means comprises a plurality of transparent membrane switches wherein, each transparent membrane switch overlays a different section of the display means and actuation of a switch provides a signal indicating selection by the user of the procedure presented by the underlaying section of the display means.

7. The device of claim 1, wherein the display means comprises a CRT.

8. The device of claim 1, further comprising:

second connector means for connecting the I/O device to the keyboard of the host computer;

means for intercepting keystrokes codes generated by the depression of keys on the keyboard of the host computer;

means for selectively transmitting said keystroke codes to the host computer.

9. The I/O device of claim 8, further comprising means for allowing the user to edit the control program.

10. The I/O device of claim 9, wherein the user may edit the control program to add new procedures to the groups of procedures provided by the control program.

11. The I/O device of claim 9, wherein the user may edit the control program to modify procedures provided by the control program.

12. The device of claim 8, wherein the means for selectively transmitting comprises:

means for comparing an intercepted keystroke code with a listing of forbidden keystrokes codes to determine whether the keystroke code is a forbidden keystroke code;

means for preventing transmission of the keystroke code and generating an error signal if the keystroke code is a forbidden keystroke code.

13. The device of claim 1, further comprising means for atrophying procedures which are not selected by the user within a predetermined number of consecutive presentations of the procedure.

14. The device of claim 1, wherein the host computer further comprises a display screen and the target program provides a cursor visible on the display screen, said cursor being movable over the display screen, wherein the user may direct the movement of the cursor by transmitting keystroke codes to the host computer; and said device further comprising:
pressure actuated means for providing cursor signals when actuated by the user, said cursor signals being indicative of a direction and an incremental distance of cursor movement;

fourth processing means, responsive to the cursor signals, for generating sets of keystroke codes to direct movement of the cursor;

fifth processing means, for transmitting the sets of keystroke codes to the host computer to direct movement of the cursor.

15. The device of claim 14, further comprising:
means for selecting the incremental distance of cursor movement.

16. The device of claim 15, wherein the incremental distance selecting means comprises a plurality of domain keys, each of said domain keys specifying a different incremental distance of cursor movement.

* * * * *